Dec. 3, 1940.  R. E. TARPLEY  2,223,585
RESISTANCE DEVICE

Original Filed Oct. 23, 1936  4 Sheets—Sheet 1

INVENTOR.
Raymond E. Tarpley
BY
Cornelius D. Ehret
ATTORNEY.

Dec. 3, 1940.  R. E. TARPLEY  2,223,585
RESISTANCE DEVICE
Original Filed Oct. 23, 1936    4 Sheets-Sheet 2
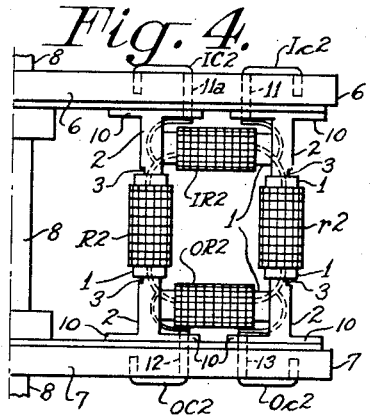
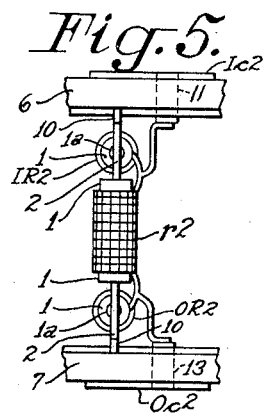
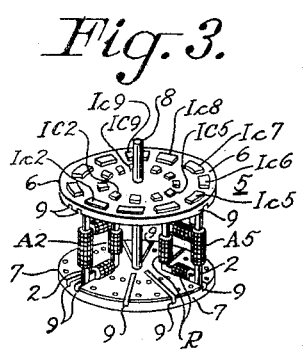
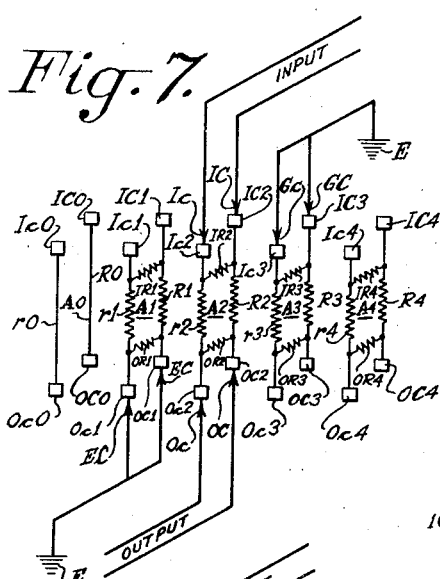
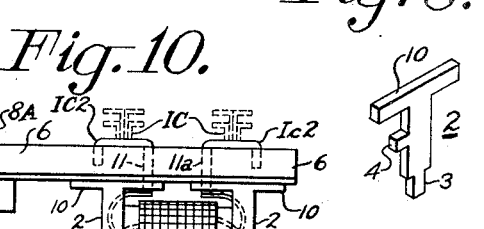
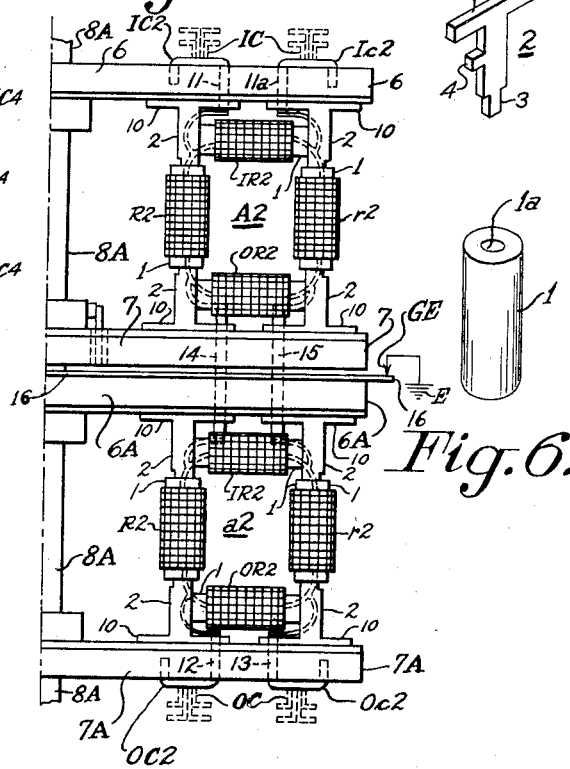
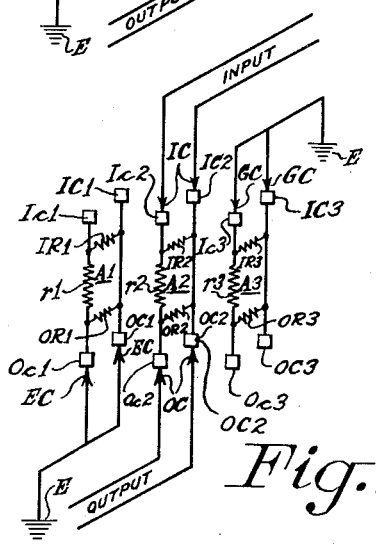
INVENTOR.
Raymond E. Tarpley
BY
Cornelius D. Ehret
ATTORNEY.

Dec. 3, 1940.   R. E. TARPLEY   2,223,585
RESISTANCE DEVICE
Original Filed Oct. 23, 1936   4 Sheets—Sheet 3
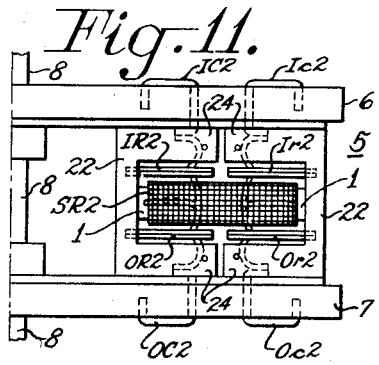
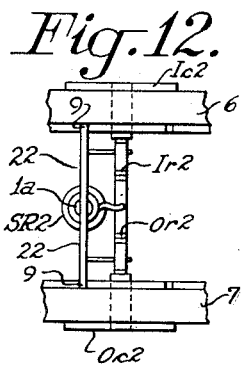
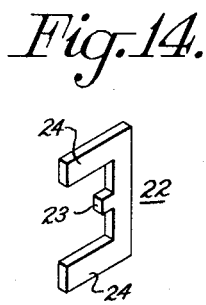
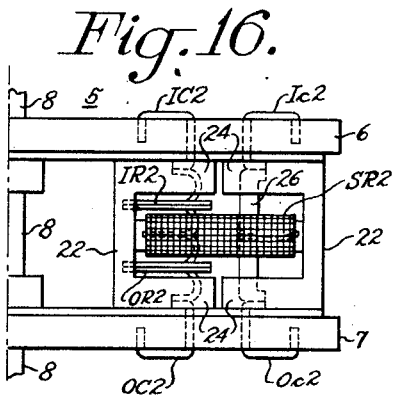
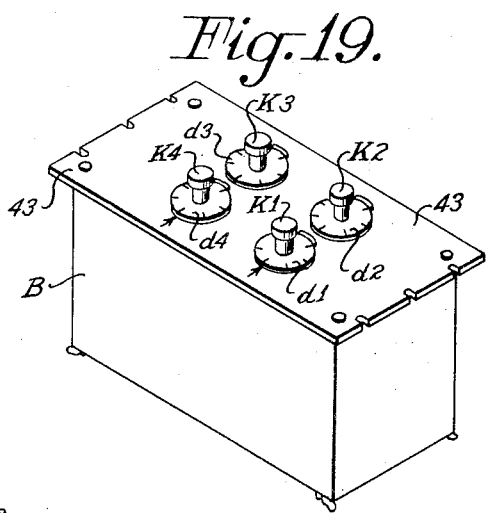
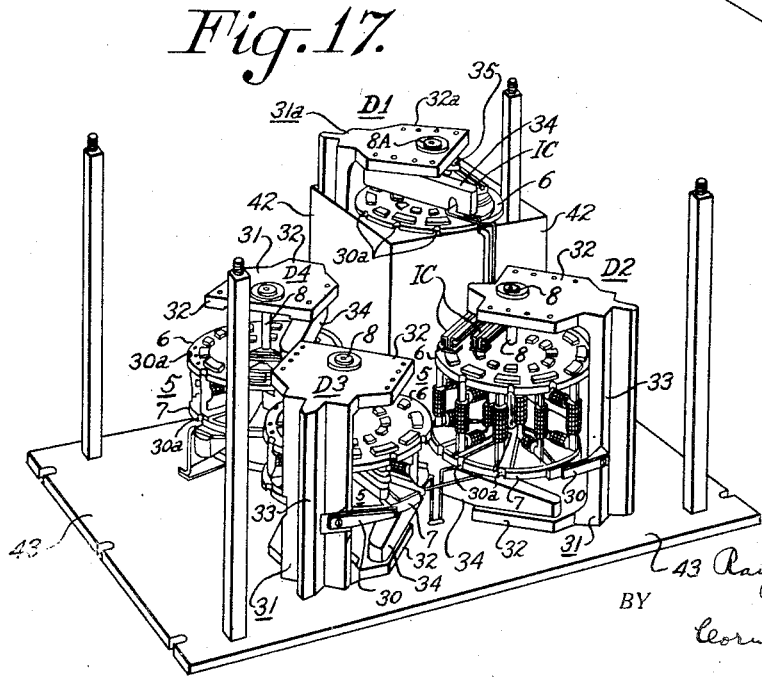
INVENTOR.
Raymond E. Tarpley
BY
Cornelius D. Ehret
ATTORNEY.

Dec. 3, 1940.  R. E. TARPLEY  2,223,585
RESISTANCE DEVICE
Original Filed Oct. 23, 1936   4 Sheets—Sheet 4

INVENTOR.
Raymond E. Tarpley
BY
Cornelius D. Ehret
ATTORNEY.

Patented Dec. 3, 1940

2,223,585

UNITED STATES PATENT OFFICE 2,223,585

RESISTANCE DEVICE

Raymond E. Tarpley, Philadelphia, Pa., assignor to Leeds & Northrup Company, Philadelphia, Pa., a corporation of Pennsylvania Original application October 23, 1936, Serial No. 107,139. Divided and this application April 26, 1939, Serial No. 270,128

16 Claims. (Cl. 178—44)

My invention relates to improvements in the construction and assembly of resistance devices, such as attenuators, resistance boxes and the like, used in electrical measuring circuits or networks.

Although not in all its aspects so limited, my invention is particularly concerned with arrangements for so mounting and electrically connecting in circuit resistors, which of themselves have insubstantial inductance and capacity, that their desirable characteristics are preserved and imparted to apparatus or devices utilizing them, to insure measurements, of high precision, in circuits or networks traversed by currents of widely different frequencies, including high radio frequencies.

My invention further resides in an attenuator comprising a plurality of pads each including a plurality of resistors, more particularly woven resistors, which individually, and collectively because of their interconnections and relative positions, have inappreciable inductance and capacity, or inappreciable phase angles at high frequencies, with the pads so mounted or positioned with respect to each other that, regardless of which of the pads is brought into circuit by switching means, there always obtain the same relations between the resistors of the pad in circuit and the resistors of the other pads, or there always obtain the same relations between the resistors of the pad in circuit and between them and the resistors of the other pads out of circuit, that the phase angle of the attenuator remains substantially constant for all positions of the switching means.

My invention resides in the features of construction, combination and arrangement hereinafter described and claimed.

This application is a division of my application Serial No. 107,139, filed October 23, 1936.

For an understanding of my invention, reference is made to the accompanying drawings, in which.

Fig. 3, in perspective, shows an attenuator drum, with some of the attenuator pads assembled thereon;

Fig. 4, in front elevation and on enlarged scale, shows a pad assembly of Fig. 3;

Fig. 5 is an end elevation of parts appearing in Fig. 4;

Fig. 6 illustrates, in perspective, a supporting or core member for a woven resistor;

Fig. 7 illustrates the connections of an attenuator using pads of the balanced $\pi$ type shown in Fig. 4;

Fig. 8, in perspective, shows one of the resistor mounting elements of Figs. 3 to 5;

Fig. 9 illustrates the connections for attenuator pads of the unbalanced $\pi$ type;

Fig. 10 illustrates a dual drum arrangement for double-section attenuator pads.

Figure 13:
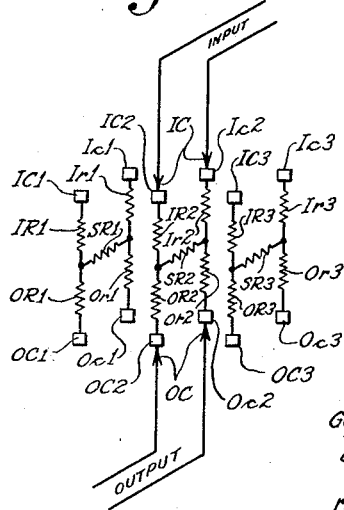
Figure 15:
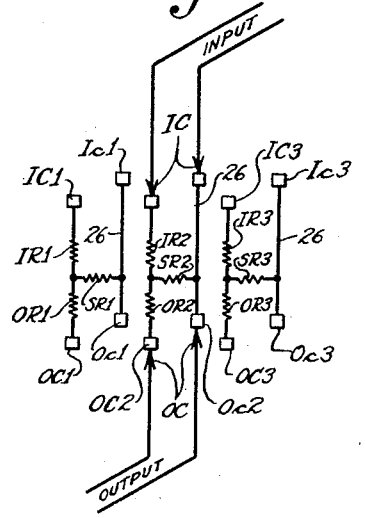
Figure 20:
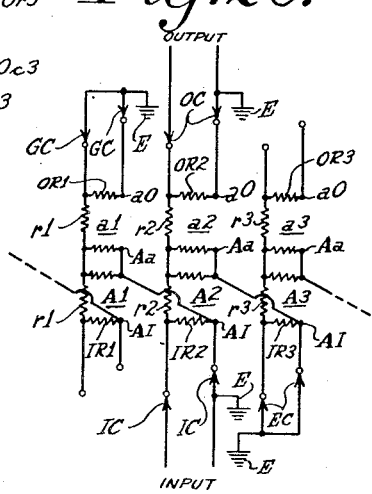
Figure 18:
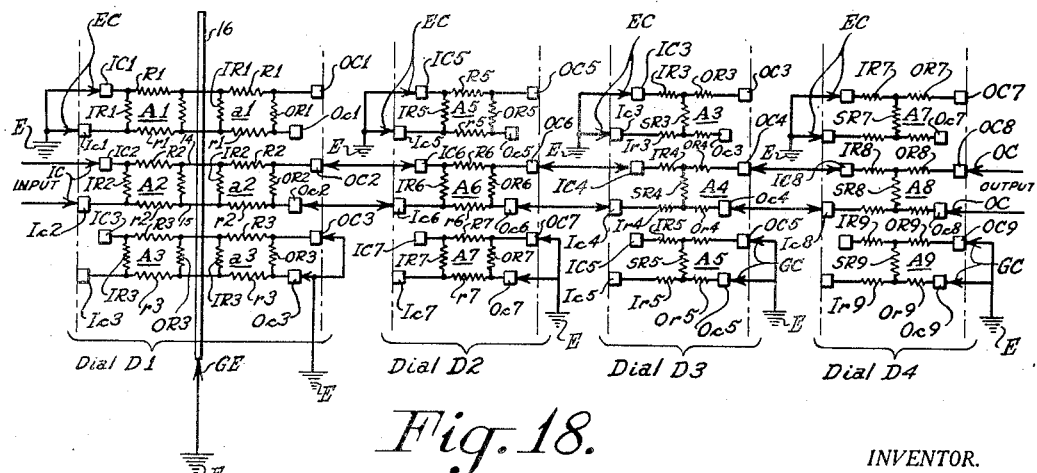

Fig. 11 shows a mounting arrangement for H type attenuator pads;

Fig. 12 is an end view of parts appearing in Fig. 11;

Fig. 13 illustrates the connections for H type pads;

Fig. 14 is a perspective view of one of the resistor mounting elements of Figs. 11 and 12;

Fig. 15 illustrates the connections for attenuator pads of the T type;

Fig. 16 shows the mounting arrangement for resistors of a T pad;

Fig. 17, in perspective, illustrates the construction of a four-dial attenuator;

Fig. 18 illustrates the electrical connections of the attenuator shown in Fig. 17;

Fig. 19 is a perspective view of the attenuator of Fig. 17 housed for use;

Fig. 20 illustrates the connections for an attenuator using double-section pads of the unbalanced $\pi$ type.

The resistors used in measuring circuits or apparatus such as attenuators, resistance boxes, bridges, voltage dividers and the like are usually calibrated with direct current or current of a particular frequency; for measurements at other, and often widely different frequencies, it is essential the resistors have negligible inductance and capacity, otherwise the variation in phase angle of the resistors introduces error whose magnitude is different for different frequencies and for different settings of the apparatus.

In my Patent No. 1,972,499 and in my aforesaid application, there are disclosed and claimed woven resistors having substantially pure and constant resistance even at radio frequencies, which, for at least some forms of my resistors, may be of the order of four megacycles per second and higher. When woven resistors of the types therein described are used in measuring circuits or apparatus, full benefit thereof may not be realized because of hereinafter discussed effects or relations which are not of importance with inferior resistors because of the large errors due to the resistors themselves; the significant features of construction and arrangement hereinafter described are primarily to utilize to their fullest advantage woven resistors of the aforesaid types only two of which, for brevity, are herein specifically described.

Figure 1A:
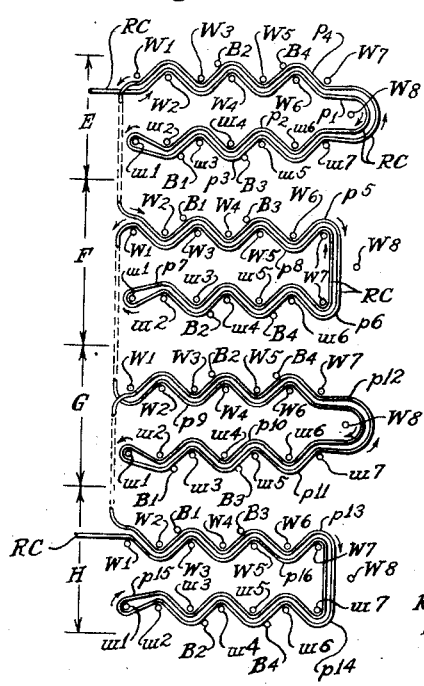
Fig. 1a is a connected series of cross-sections taken on lines E—E, F—F, G—G and H—H of Fig. 1.
Figure 1:
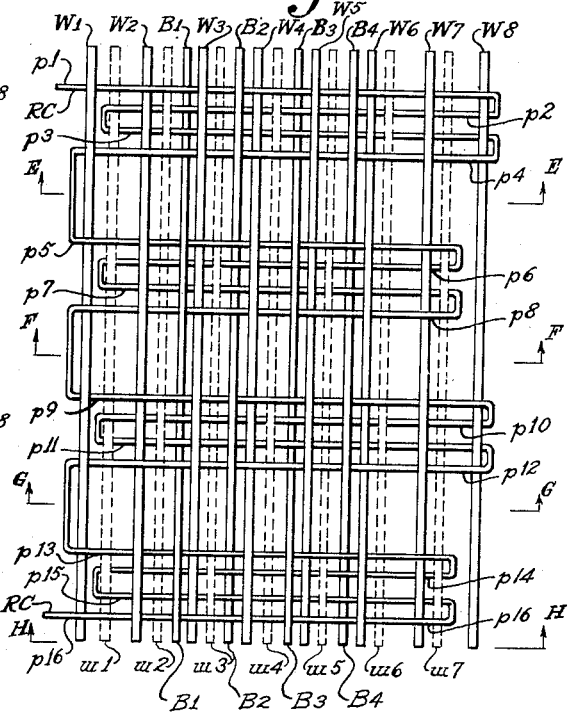
Fig. 1 illustrates the weaving pattern of a woven resistor.
Figure 2:
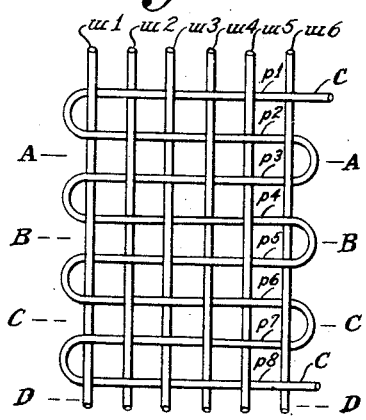
Fig. 2 illustrates the weaving pattern of another type of woven resistor.
Figure 2A:
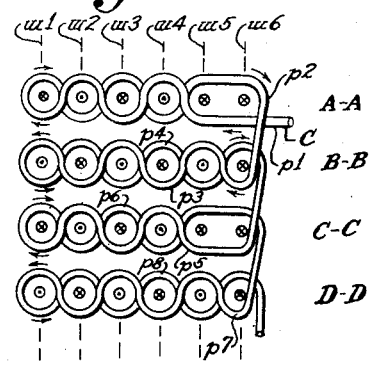
Fig. 2a is a connected series of cross-sections taken on lines A—A, B—B, C—C and D—D of Fig. 2.

Referring to Figs. 1 and 1a, corresponding with Figs. 2 and 2a of my aforesaid application, the resistance conductor RC is woven on two warps of suitable material, for example silk threads; the upper warp comprises the warp threads or elements W1, W2, W3, etc., and the lower warp comprises the warp threads or elements $w1$, $w2$, $w3$, etc. The actual number of warp elements is, of course, substantially greater than shown in Figs. 1 and 1a illustrative of the weaving pattern; for clarity, the size of the warp threads and of the conductor is exaggerated; for like reason, the spacing between the elements of the warps and between the picks of conductor is also exaggerated.

For purpose of explanation, it is assumed the weaving begins at the upper left of Figs. 1 and 1a. To avoid lengthy description, the relation between the warp elements and picks of conductors are tabulated below in Table 1. It is assumed for simplicity the number of threads in both warps are even; i. e., "n" of Table 1 is an even number; the letters "o" and "u" are used as abbreviations of "over" and "under," respectively. With this preliminary explanation, Table 1 is explanatory of the manner in which the shuttle lays the conductor in the warps.

*Table 1*

| Section | Pick | Movement of shuttle | \multicolumn{8}{c}{Warp threads $n$=even number} | Layer |
| --- | --- | --- | --- | --- | --- | --- | --- | --- | --- | --- | --- |
| | | | 1 | 2 | 3 | 4 | 5 | 6 | | $n-1$ | $n$ | |
| E | p1 | To right | u | o | u | o | u | o | ... | u | o | Upper |
| | p2 | To left | o | u | o | u | o | u | ... | o | u | Lower |
| | p3 | To right | u | u | o | u | o | u | ... | o | u | Lower |
| | p4 | To left | u | o | u | o | u | o | ... | u | o | Upper |
| F | p5 | To right | o | u | o | u | o | u | ... | o | | Upper |
| | p6 | To left | u | o | u | o | u | o | ... | u | | Lower |
| | p7 | To right | o | o | u | o | u | o | ... | u | | Lower |
| | p8 | To left | o | u | o | u | o | u | ... | o | | Upper |

It is to be understood the positions of the elements of each warp are transposed at the conclusion of the weaving of one section and before weaving of the next section is begun; and that the weaving pattern of the subsequent sections corresponds alternately to section E and section F; for example, section G is woven in the same manner as section E and section H is woven the same as section F.

When the number of elements in each of the warps is an odd number, rather than even as in Fig. 1, and Table 1, a slight variation in the weaving pattern results; it is not essential that both the upper and lower warps have the same number of threads, or that the number of threads in both warps be odd or even.

From Fig. 1a, it clearly appears that each section of the woven resistor consists of a folded bifilar loop, one part or fold appearing in the upper layer of the multi-ply web and another part or fold appearing in the lower ply. The completed resistor is non-inductive because (a) the current flows in opposite directions in each pair of picks in the upper and in the lower warps; (b) the current in adjacent loops of conductor about lower warp element $w1$ flows in opposite directions, and (c) the current in adjacent loops of conductor about upper warp element W1 flows in opposite directions.

The plies or layers of the resistance webbing are held together by the binder warp exemplified by threads B1, B2, B3, etc. As shown in Fig. 2, the odd-numbered binder threads B1, B3, etc., pass under the bottom ply of sections E, G, etc. and over the top layer of the intermediate sections F, H, etc.; the even-numbered binder threads B2, B4, B6, etc. pass over the top layer of sections E, G, etc. and under the bottom layer of sections F, H, etc.

The inductance of the web resistor is negligible for reasons discussed above; the capacity effect of the resistor is negligible because there is, in use, only a small difference of potential between any of the immediately adjacent picks of conductor.

The physical size of the completed resistor will, of course, depend upon the desired magnitude of its resistance, the cross-sectional area of the resistance conductor, and the resistivity of the conductor material. To facilitate weaving, the conductor should be flexible but strong; for example, manganin or nichrome wire of from .004 to .001" diameter is suitable. The conductor need not be round wire; it may be ribbonlike wire, for example, up to about .004" thick and up to about .020" wide.

For high precision resistors having low temperature co-efficient of resistance, the conductor may be manganin, constantan, or the like; to procure compact resistors of high magnitude of resistance, for example upwards of 100,000 ohms, nichrome wire may be used. As exemplary of the compactness of the woven resistors of my invention, a 300,000 ohm resistor webbing woven with nichrome wire of .001 diameter is about 1.1 inches long and 2.35 inches wide; moreover, the web may be folded or rolled lengthwise, further to reduce its space requirements, without appreciably increasing the capacity or inductance.

Preferably, enamel-coated conductor is used because enamel insulation is thinner than silk or cotton and therefore permits the picks of conductor to be packed more closely together in the warp; moreover, a resistor of enamel-coated wire is less subject to variation from its nominal value with time and humidity than resistors using the usual silk or cotton insulation.

Referring to Figs. 2 and 2a, corresponding with Figs. 2 and 2a of my aforesaid patent, the conductor C in the first pick passes under both the warp elements $w1$ and $w2$. The remainder of the pick is the normal weave, and normal weave is continued until the warp elements $w1$ and $w2$ are again reached, whereupon the conductor now passes over both of these elements. The next pair of picks p3 and p4 are woven in the normal manner, but the next pair of picks p5, p6, are similar to the first pair of the picks p1, p2, that is, in the first pick of the pair, the conductor passes under two adjacent warp elements $w1$, $w2$, and in the next pick the conductor passes over the same two elements. The next pair of picks is of normal weave, the same as picks p3 and p4. The pattern is repeated with alternate pairs of picks of normal weave and every other pair of picks of the modified weave.

The effect upon the inductance of the woven resistor is apparent from Fig. 2a. Taking the warp element w1, for example, it is to be noted that the inductive loops formed by the picks are alternately of different polarity so that their inductive effects annul each other, the warp element forming in effect the core of a non-inductive solenoid. Similarly, the warp elements w5, w4, etc., form the cores of non-inductive solenoids. With this mode of weaving, however, the inductive loops about the warp element w6, at one of the selvedge edges, are cumulative so that warp element w6 forms the core of an inductive solenoid.

With this type of woven resistor, the inductance is so low as to permit of its use in precision circuits such as used in measuring, through a substantial range of frequencies, without introducing any serious error.

With resistors woven in accordance with Figs. 3 and 3a of my aforesaid patent and ranging from 20 to 20,000 ohms, the variation of resistance with a frequency range of from zero to about 50,000 cycles (50 kilocycles) is not greater than the precision of measurement; for example, the resistance error in 10,000 ohm woven units is less than 0.01% for frequencies from zero to at least 50,000 cycles; for resistances lower than 10,000 ohms the error is less, and at 1000 ohms does not exceed 0.001%. For all values of resistances up to 10,000 ohms, the error at 1000 cycles is less than 0.001%.

The multi-ply type of web resistor, Figs. 1 and 1a, and, in fact, any of the multi-ply resistors of my aforesaid application, is much superior at the higher radio frequencies to the single-ply resistor of Figs. 2 and 2a. As exemplary of the advantage of the multi-ply resistors, tests made at a frequency of 4 megacycles (4000 kilocycles) per second on a three-dial attenuator, having steps of 0.1, 1.0 and 10.0 decibels, disclosed for settings between 0 and 50 decibels a maximum phase shift of less than 2°. This attenuator has at a frequency of 1 megacycle (1000 kilocycles) per second substantially the same phase angle (less than 0.5 degree) as an attenuator using selected single-ply resistors (Figs. 3 and 3a of my aforesaid patent) had at 50 kilocycles.

In Fig. 3 a plurality of resistors are shown suitably mounted for use as pads of an attenuator. Each of the resistors R is formed by folding or rolling resistance webbing, woven as previously herein described, lengthwise around a form 1, such as shown in Fig. 6, of material such as "Isolantite" having small dielectric losses. Preferably, the unit is then impregnated with ceresin or the like to exclude air or moisture.

The rolling or folding of the webbing lengthwise on or about the form does not appreciably change the relations to each other of the picks of conductor of the same or different layers of the web; consequently, there is no appreciable change of the inappreciable inductance or capacity of the resistor.

In assembling a balanced π pad, or section, such as diagrammatically shown in Fig. 7, four resistance units are mounted in the manner illustrated in Figs. 3, 4 and 5. Each of the four mounting members 2 (Fig. 8) of "Micarta" or similar suitable insulating material, is provided with a vertical tip or tongue 3 received by a recess or hole 1a in one of the vertically disposed resistance units and a horizontal tip or tongue 4 received by a recess 1a or hole in one of the horizontally disposed resistance units.

The several pad assemblies A0—A9 are alike mechanically, but differ electrically; the values of the several resistances, in accordance with known practice, differ in the different pads to provide for attenuation in steps of desired magnitude.

The drum 5, Fig. 3, rotatable to introduce into circuit a selected pad comprises two disks 6 and 7 secured to shaft 8. Each of the disks is provided with substantially radial slots 9 to receive snugly guide extensions 10 of the mounting elements 2. The slots 9 in the upper and lower disks 6 and 7 are in vertical alignment and the spacing between the disks is such that when the assembled pads are in place the whole array is mechanically rigid. For clarity of illustration, only two pad assemblies (A2, A5) are shown in place in Fig. 3.

Upon each of the disks 6 and 7 are mounted two rows of contacts, the number of contacts in each row depending upon the number of attenuation steps, for example, eleven contacts for ten steps. Referring specifically to Figs. 4 and 5, the leads from the upper shunt resistance IR2 are connected to studs 11a and 11 extending through the disk 6 and connected, respectively, to contacts IC2 and Ic2 of the inner and outer rows of contacts, respectively. Similarly, the lower shunt resistance OR2 is connected across contacts OC2 and Oc2 through studs 12, 13, extending through the lower disk 7. The series resistance R2 is connected between contacts IC2 of the upper inner row and contact OC2 of the lower inner row through studs 11a and 12. Similarly, series resistance r2 is connected between contact Ic2 of the upper outer row and contact Oc2 of the lower outer row through studs 11 and 13. The connections between the resistances of the pad and from the resistances of the pad to the drum contacts are short and direct minimizing both inductance and capacity effects. The interconnections of the resistors of the pad and the positional relations of the resistors of the pad to each other are such the pad, or group of resistors, has inappreciable inductance and capacity.

When the drum 5 is in position to include this pad A2 in circuit, as shown in Fig. 7, the stationary input contacts Ic and IC engage, respectively, the upper drum contacts Ic2 and IC2 and the stationary output contacts Oc and OC engage, respectively, the lower drum contacts Oc2 and OC2.

The other pads are similarly mounted and connected to the upper and lower drum contacts, as clearly appears from Fig. 7; the only exception being that for the drum or dial position corresponding to zero attenuation, the pad is simply two heavy conductors, one, R0, between the outer contacts Ic0 and Oc0 and the other, r0, between the inner contacts IC0 and OC0. With the switching arrangement shown, only one pad of the drum is in circuit at a time and the selected pad is entirely disconnected from the resistors of all other pads. The circuit configuration, whichever pad is in circuit, is the same because the resistors of each pad when in circuit bear to each other and to the resistors of all other pads always the same physical or geometric relations. Substitution in circuit of one pad for another does not cause any appreciable shift or change in the phase angle of the attenuator.

It has been found desirable to connect the pads on either side of the selected pad to earth or equivalent. Referring to Fig. 7, when the second pad A2 is in circuit, as shown, the adjacent pad A3 on the right is connected to ground E by engagement of the grounded contacts GC with the contacts Ic3 and IC3 of the upper disk, and the adjacent pad A1 to the left of pad A2 is connected to earth E by engagement of the grounded contacts EC with the contacts Oc1 and OC1 of the lower disk. As each pad is connected in circuit by movement of the drum, the two adjacent pads are concurrently grounded. This expedient has been found desirable to avoid, particularly at radio frequencies, effects due to direct stray capacitance between input and output elements or conductors which, because of the substantial elimination of phase error due to the resistances, become a limiting factor of the accuracy of the attenuator calibration.

When the attenuator is to be of the unbalanced $\pi$ type, the same mechanical arrangement of forms 1 and mountings 2 may be employed; the only difference is that no resistance web is placed on one of the vertical forms 1. The typical connections are shown in Fig. 9.

For effecting high attenuations, as in steps of about 30 decibels or more, it is desirable to have each attenuating pad comprise more than one simple section. Referring to Fig. 18, dial D1, each of the pads comprises two balanced $\pi$ networks in series. The mechanical construction for the drum of dial D1, Fig. 18, as shown in Fig. 10, consists of two drums such as shown in Fig. 3, mounted upon a common shaft 8A; the contacts are omitted from the lower face of the upper drum disk 7 and from the upper face of the lower drum disk 6A. Conductors extending through disks 6A and 7 connect the sections of each pad in series between input contacts on disk 6 and output contacts on disk 7a; for example, as appears in Fig. 10, conductors 14, 15 connect sections A2, a2 of the second pad of dial D1, Fig. 18, in series between the input contacts Ic2, IC2 and the output contacts Oc2, OC2 of that pad.

To shield the two sections of each pad from one another, a shielding plate or disk 16 is interposed between the upper and lower drums. This shielding plate is connected to earth, or equivalent, as by the brush contact GE; actually the brush contact GE and brush contacts EC and GC are connected to the hereinafter described metal chassis or housing of the attenuator.

Figs. 11 and 12 illustrate a suitable mounting for the pads when of the H or balanced T type such as diagrammatically shown in Fig. 13. In lieu of four mounting pieces 2, such as shown in Fig. 8, there are utilized two E-shaped mounting elements 22, Fig. 14, having a tip 23 adapted to be received by the recess or hole 1a in one end of the form 1 which supports the shunt resistor SR2 of the pad, Fig. 11. The upper and lower extensions 24, 24 are received by substantially radial slots 9 in the upper and lower disks 6, 7 of the attenuator drum. For each pad, two E pieces 22 are positioned in opposed relation in a pair of substantially radial slots 9, 9, the tips 23 entering the opposite ends of the resistor core piece 1 to hold the woven resistor in fixed position.

The series coils IR2, Ir2, OR2, Or2, Fig. 11, of the pad may be wound or folded on themselves and supported from pins, carried on pieces 22, by their leads.

When the attenuator pads are of the unbalanced T type, such as diagrammatically shown in Fig. 15, the mounting for the resistors, as appears from Fig. 16, is similar to Figs. 11 and 12. The shunt coil SR2, for example, is positioned by a pair of opposed E-shaped members 22. One pair of series coils, such as Ir2, Or2, is omitted and contacts Ic2, Oc2 of the pad are directly connected by a heavy conductor 26. The pads, other than the zero attenuation pad, are similar except, of course, different values of resistances are used for the series and parallel resistors of the different pads to obtain the desired attenuations.

Fig. 17 discloses the internal construction and arrangement of a four-dial attenuator box whose connections are diagrammatically shown in Fig. 18. The drum construction for the first dial D1 is similar to the double drum of Fig. 10 and the drum construction for each of the remaining dials D2, D3, D4 is similar to that shown in Fig. 3. The shafts of the dial drums are connected respectively to the knobs K1, K2, K3, and K4, operable externally of the attenuator box B, Fig. 19. The dials d1, d2, d3, d4, rotatable with the knobs, respectively, are provided with numbers cooperating with the several pointers or indexes to indicate the attenuation settings. The periphery of one of the disks 6, 7 of each drum is provided with a plurality of notches 30a to cooperate with a click spring 30, Fig. 17, which drops into one of the notches 30a when the drum contacts engage the associated stationary contacts to include in circuit the attenuator pad corresponding to the dial setting.

Preferably, as indicated in Fig. 17, the drum-resistor assembly of the high attenuation dial D1 is substantially completely surrounded by a shield 42 electrically connected to the metal panel 43 of the attenuator.

The castings 31 for supporting the drum shafts of dials D2, D3 and D4 are identical; each comprises a pair of end members 32, 32 and a connecting member 33. Each of the end members 32 carries a block 34 of suitable insulating material for supporting a pair of brush contacts corresponding to contacts Ic, IC or contacts Oc, OC of Fig. 7, for example, and also a block 35 for supporting a pair of contacts corresponding to contacts GC, GC or contacts EC, EC of Fig. 7. Preferably blocks 35 are of metal and electrically connected to the metal panel of the attenuator box.

The casting 31a for supporting the drum shaft 8A of dial D1 is similar to castings 31 except there is greater spacing between the ends 32a to accommodate the duplex drum, Fig. 10, each of the end members 32a supports two blocks 34, 35, having the same purpose as the corresponding blocks of the other dials.

The circuit relations of the movable and stationary contacts of each dial clearly appears in Fig. 18, in which for simplicity only a limited number of pads is shown for each dial; actually in the attenuator corresponding to Figs. 17 to 19, each dial is provided with ten pads; the first dial D1 affords attenuation from 0 to 100 decibels in steps of ten decibels; the second dial D2 from 0 to 10 decibels in steps of one decibel; the third dial D3 from 0 to 1.0 decibel, in steps of one-tenth decibel, and the fourth dial D4 from 0 to 0.1 decibel in steps of one-hundredth decibel. In Fig. 18, the dials are set to afford an attenuation of 26.48 decibels.

In general, the shunt resistors of the lower attenuation steps and the series resistors of the higher attenuation steps are of substantially high resistance and are made by any of the methods of Figs. 1, 2, 3, 6 and 7 of my aforesaid application Serial No. 107,139, whereas, for smaller values of the shunt and series resistors of various pads, the methods of Figs. 4 and 5 of that application are preferable.

With some sacrifice of accuracy at higher radio frequencies, the resistors may be of the single-ply type shown in Figs. 2 and 2a hereof.

In Fig. 18, the pads of the high attenuation dial DI are of the balanced type. In Fig. 20 is shown a suitable arrangement for a higher attenuation dial using pads of the unbalanced type. In accordance with prior practice, the terminals AI, Aa, a0 of the shunt or coupling resistors of each pad would be connected to a conductor extending directly from an input contact to an output contact. It was found, however, that with such connections, the attenuation actually realized, at high frequencies, was substantially less than the attenuation indicated by the dial setting and actually obtained at low frequencies. The reduction in attenuation was substantial at 600 kilocycles and increased with frequency.

The reduction in attenuation was apparently due to the fact that sections of conductor between points IC and AI, AI and Aa, Aa and a0 had appreciable inductive reactance at the higher frequencies. The difficulty was overcome by connecting the point Aa to the panel or shielding to which the input and output contacts IC and OC were connected, Fig. 20. To avoid need for an additional drum contact for each pad and an additional brush, the point Aa of each pad is connected, as appears in Fig. 25, to the point AI of an adjacent pad. Thus, as each pad is connected in circuit, each of its points a0 and Aa is connected to the input contact IC through the chassis or panel whose impedance is negligible and therefore introduces inappreciable coupling between the two sections of the pad. The current paths from points a0, Aa, and AI of the pad in circuit to the input contact IC are substantially independent, or at least have negligible common impedance even at high radio frequencies.

With inferior types of resistors having appreciable capacity and/or inductance, the herein described mountings and arrangements have constructional advantages but with the types of woven resistors described in my aforesaid patent and application, they have additional advantages, electrical in nature, which permit realization to fullest extent of the inappreciable phase angle of those resistors, small even at radio frequencies.

What I claim is:

1. A multi-step attenuator having negligible phase angle for all settings comprising pads each consisting of woven resistors each having negligible inductance and capacity, and switch structure for connecting a selected pad in circuit and concurrently connecting an adjacent pad to a point of low potential.

2. A multi-step attenuator having negligible phase angle for all settings comprising pads each consisting of woven resistors each having negligible inductance and capacity, and switch structure for connecting a selected pad in circuit and concurrently connecting the adjacent pads to a point of low potential.

3. An attenuator comprising rotatable structure, groups of woven resistors, each group forming a pad of the attenuator, carried by said structure, a group of contacts associated with each of said pads and carried by said structure, stationary contacts engageable by any of said groups of contacts selectively to include in circuit one of said pads, and stationary contacts for concurrently engaging contacts associated with the pad adjacent the selected pad to connect it to a point of low potential.

4. An attenuator comprising rotatable structure, groups of woven resistors, each group forming a pad of the attenuator, carried by said structure, a group of contacts associated with each of said pads and carried by said structure, stationary contacts engageable by any of said groups of contacts selectively to include in circuit one of said pads, and stationary contacts for concurrently engaging contacts connected to the pads on either side of the selected pad to connect them to a point of low potential.

5. An attenuator comprising rotatable disks having radial slots in opposed faces thereof, and a plurality of pad assemblies, each received and positioned by a pair of slots, one in each disk, and comprising a frame on which is mounted a plurality of woven resistors.

6. An attenuator pad comprising a series of unbalanced sections and including input, output and intersection coupling resistances, and means insuring constant attenuation by said sections of said pad throughout a wide range of frequencies including high radio frequencies comprising connections concurrently providing substantially independent paths of low impedance from a terminal of each of said coupling resistors to, a common input terminal of the pad to avoid undesired reactive coupling between said sections.

7. An attenuator comprising a plurality of pads each comprising a series of unbalanced sections, input and output contacts for inclusion of a selected pad in circuit, conductive structure of negligible impedance connecting one of said input contacts to one of said output contacts, contacts connected to said conductive structure for connections with a pad adjacent the selected pad, and a connection from the inter-section shunt resistances of each pad to a terminal shunt resistance of an adjacent pad.

8. An attenuator comprising a plurality of pads each comprising a series of unbalanced sections including input, output and inter-section coupling resistors, input and output contacts for inclusion in circuit of a selected pad, and means for avoiding undesired reactive coupling between said sections comprising conductive structure of negligible impedance connecting one of said input contacts to one of said output contacts, and contact means for selectively connecting to said conductive structure the inter-section resistance of the selected pad.

9. A step-by-step attenuator comprising a rotatable drum having end disks, rows of angularly spaced input contacts on one of said disks, rows of angularly spaced output contacts on the other of said disks, a plurality of resistor pad assemblies each mounted between said disks, connections from terminals of each of said pads to input and output contacts of said first-named and second-named rows, and means for including in circuit only a selected one of said pads comprising a pair of brushes for successively engaging pairs of said input contacts in aforesaid different rows thereof on one of said disks and another pair of brushes successively engaging pairs of said output contacts of said different rows thereof on the other of said disks.

10. A device comprising a rotatable drum including end members having slots in the opposed faces thereof, a plurality of resistance unit assemblies each comprising mounting structure whose opposite ends are received by a pair of said opposed slots, a series of angularly spaced contacts on each of said end members connected to resistors of said assemblies respectively, and a pair of stationary contact brushes adjacent said members, respectively, for selective engagement with pairs of contacts of said two series of contacts.

11. A device comprising a rotatable drum including two end disks having in their inner opposed faces slots extending inwardly from their peripheries, a plurality of resistance unit assemblies each comprising a mounting structure whose opposite ends are received by a pair of said opposed slots, a series of angularly spaced contacts on the outer face of each of said disks and connected to resistors of said assemblies, and a pair of stationary contact brushes adjacent said disks respectively for selective engagement with pairs of contacts of said two series thereof.

12. An attenuator pad of the balanced $\pi$ type comprising mounting structure assembled from four legs positioned to simulate a hollow square, a woven resistor supported by each of said legs, and electrical connections between said resistors.

13. An attenuator pad of the balanced $\pi$ type comprising mounting structure assembled from four legs positioned to simulate a hollow square, the shunt pad-resistors mounted on one pair of opposite legs of said structure, and the series pad-resistors mounted respectively on the legs of the other pair.

14. An attenuator pad of the balanced $\pi$ type comprising four core members, a woven resistor on each of said core members, and connecting pieces each mechanically connecting an end of one of said core members to an end of another of said core members to provide a frame on which said resistors are maintained in fixed relative positions.

15. An attenuator pad of the $\pi$ type comprising four core members, connecting pieces each mechanically connecting an end of one of said core members to an end of another of said core members, and a woven resistor on each of at least three of said core members.

16. An attenuator pad of the T type comprising spaced supporting structures having recessed inner faces, the series pad-resistors supported between said structures by their leads, a pair of mounting members each having its opposite ends engaging said structures and having an extension intermediate its ends directed toward the other of said members, and the shunt pad-resistor supported by said extensions between said structures.

RAYMOND E. TARPLEY.